(12) United States Patent
Lombardi

(10) Patent No.: US 8,392,266 B2
(45) Date of Patent: Mar. 5, 2013

(54) SYSTEM AND METHOD FOR CERTIFYING INFORMATION RELATING TO TRANSACTIONS BETWEEN A SELLER AND A PURCHASER

(75) Inventor: Davide Lombardi, Treviso (IT)

(73) Assignee: Omnione USA, Inc., Dover, DE (US)

( * ) Notice: Subject to any disclaimer, the term of this patent is extended or adjusted under 35 U.S.C. 154(b) by 391 days.

(21) Appl. No.: 12/618,150

(22) Filed: Nov. 13, 2009

(65) Prior Publication Data

US 2011/0119154 A1    May 19, 2011

(51) Int. Cl.
*G06Q 30/00*    (2012.01)

(52) U.S. Cl. ............. 705/26.1; 705/1.1; 705/26.35; 705/26.41; 705/35; 705/37; 707/740; 707/E17.089

(58) Field of Classification Search .......... 705/1.1, 705/26.1, 26.41, 26.35, 35, 37; 707/740, 707/E17.089
See application file for complete search history.

(56) References Cited

U.S. PATENT DOCUMENTS

| | | | |
|---|---|---|---|
| 6,092,054 A | 7/2000 | Tackbary | |
| 6,876,979 B2 | 4/2005 | Ling | |
| 6,892,184 B1 | 5/2005 | Komem | |
| 6,938,005 B2 | 8/2005 | Iverson | |
| 7,124,100 B2 | 10/2006 | Pirillo | |
| 7,162,436 B1 | 1/2007 | Eckel, Jr. | |
| 7,225,145 B2 | 5/2007 | Whitley | |
| 7,346,556 B2 | 3/2008 | Upendran | |
| 7,353,187 B1 | 4/2008 | Emodi | |
| 7,487,113 B2 | 2/2009 | Ray | |
| 7,539,628 B2 | 5/2009 | Bennett | |
| 7,552,365 B1 * | 6/2009 | Marsh et al. ............. 714/47.2 |
| 7,624,044 B2 | 11/2009 | Wren | |
| 7,865,424 B2 | 1/2011 | Pappas | |
| 7,881,981 B2 | 2/2011 | Taylor | |
| 7,881,982 B1 | 2/2011 | Pohl | |
| 7,937,296 B2 | 5/2011 | Gilberto | |
| 7,945,484 B1 | 5/2011 | Tam | |
| 7,962,374 B2 | 6/2011 | Altschuler | |
| 7,970,662 B2 | 6/2011 | Calonge | |
| 7,979,312 B2 | 7/2011 | Strimling | |
| 7,979,313 B1 | 7/2011 | Baar | |
| 7,996,273 B2 | 8/2011 | Roche | |
| 8,019,651 B2 | 9/2011 | Kaniushko | |
| 8,019,655 B2 | 9/2011 | Rupp | |
| 8,024,229 B2 | 9/2011 | Baig | |
| 8,046,266 B1 | 10/2011 | Geller | |
| 8,046,272 B1 | 10/2011 | Nguyen | |
| 8,055,551 B2 | 11/2011 | Milgramm | |

(Continued)

FOREIGN PATENT DOCUMENTS

WO    WO9840809 A2    9/1998

OTHER PUBLICATIONS

Zacharia et al., "Collaborative reputation mechanisms for electronic marketplaces", published in Decision Support Systems 29 year 2000 extracted from "Scholar Google" online on Mar. 21, 2012, hereinafter Zacharia.*

(Continued)

*Primary Examiner* — Yogesh C Garg
(74) *Attorney, Agent, or Firm* — Buchanan Nipper

(57) ABSTRACT

A method for providing certified feedback information on a transaction entity (e.g., seller, purchaser, and/or object (e.g., good, service)) involved in a transaction between a seller and a purchaser.

38 Claims, 10 Drawing Sheets

U.S. PATENT DOCUMENTS

| | | |
|---|---|---|
| 8,065,190 B2 | 11/2011 | Collas |
| 8,069,095 B2 | 11/2011 | Glazer |
| 8,086,499 B2 | 12/2011 | Stuart |
| 8,090,626 B1 | 1/2012 | Wijaya |
| 8,095,427 B1 | 1/2012 | Buxton |
| 8,095,430 B2 | 1/2012 | Abhyanker |
| 8,099,331 B2 | 1/2012 | Devries |
| 8,117,084 B2 | 2/2012 | Siegrist |
| 8,117,090 B2 | 2/2012 | Romero |
| 2002/0138402 A1* | 9/2002 | Zacharia et al. ............ 705/37 |
| 2002/0143651 A1 | 10/2002 | Kishi |
| 2003/0216929 A1 | 11/2003 | Brockway |
| 2005/0080713 A1 | 4/2005 | McHale |
| 2006/0247946 A1* | 11/2006 | Gordon ............................ 705/1 |
| 2007/0078758 A1 | 4/2007 | Susskind et al. |
| 2007/0179942 A1 | 8/2007 | Heggem |
| 2008/0005761 A1 | 1/2008 | Repasi |
| 2008/0059215 A1 | 3/2008 | Boyd |
| 2008/0147354 A1 | 6/2008 | Rowan |
| 2009/0070130 A1 | 3/2009 | Sundaresan |
| 2009/0182647 A1 | 7/2009 | Sundaresan |
| 2009/0204610 A1 | 8/2009 | Hellstrom |
| 2009/0210444 A1 | 8/2009 | Bailey |
| 2010/0312666 A1 | 12/2010 | Ku |
| 2011/0010269 A1 | 1/2011 | Ballard |
| 2011/0029406 A1 | 2/2011 | Harris |
| 2011/0047047 A1 | 2/2011 | Yuan |
| 2011/0106661 A1 | 5/2011 | Leonardo |
| 2011/0137749 A1 | 6/2011 | Kwei |
| 2011/0137751 A1 | 6/2011 | Stein |
| 2011/0145093 A1 | 6/2011 | Paradise |
| 2011/0173082 A1 | 7/2011 | Breitenbach |
| 2011/0208612 A1 | 8/2011 | Shader |
| 2011/0251908 A1 | 10/2011 | Smith, III |
| 2011/0258077 A1 | 10/2011 | Itwaru |
| 2011/0288910 A1 | 11/2011 | Garg |

OTHER PUBLICATIONS

European search report, App. No. 09175965.4 (EP2323093), dated Mar. 19, 2010.

* cited by examiner

| Position | E-mail address | Transaction Code | Date | Source | Object Rate | Shop Rate | Object Comment | Shop Comment | Request Sent |
|---|---|---|---|---|---|---|---|---|---|
| 501 | 502 | 503 | 504 | 505 | 506 | 509 | 508 | 510 | 507 |
| | | | | | | | | | |
| | | | | | | | | | |
| | | | | | | | | | |

| Position | E-mail address | Transaction Code | Date | Source | Object Rate | Shop Rate | Object Comment | Shop Comment | Object TDMK | Object model | Req. Sent |
|---|---|---|---|---|---|---|---|---|---|---|---|
| 501 | 502 | 503 | 504 | 505 | 506 | 509 | 508 | 510 | 511 | 512 | 507 |
| | | | | | | | | | | | |
| | | | | | | | | | | | |
| | | | | | | | | | | | |

SYSTEM AND METHOD FOR CERTIFYING INFORMATION RELATING TO TRANSACTIONS BETWEEN A SELLER AND A PURCHASER

TECHNICAL FIELD

The present invention relates to the certification of information relating to transactions between a seller and a purchaser. In particular, the present invention relates to a system and method for certifying information relating to people, companies, products and services that can be involved in transactions, and for generating relative certificates that can be made available via the Internet or other transmission media. The invention finds application both for on-line and off-line (brick-and-mortar business) transactions.

BACKGROUND ART

It is known that each time a transaction takes place between a seller and a purchaser the reliability of the people/entities involved is very important and can determine the success of the transaction. In this respect, in countries like Italy, insurance companies provide their clients with a "risk certificate" which indicates the reliability of a driver, i.e. his tendency to make accidents. This risk certificate determines (among other parameters) the cost of the insurance policy.

Reliability certificates are also used in electronic markets, like Amazon® and eBay®, which provide ratings for sellers and purchasers' reliability. In such a system, once a transaction has succeeded, the purchaser receives an e-mail comprising a link to a webpage; by clicking on the link, the user is prompted to the webpage where he can leave feedback on the product and on the seller. On the other side, the seller is given the possibility of leaving feedback about the purchaser's conduct.

Ratings generated within a given electronic market (like eBay®) are not recognised as valid "reliability certificates" by other web sites or markets since they are generated by people not known (not registered users) in these other web sites or markets. Each electronic market, therefore acts as a "closed system" which generates its own reliability certificates (ratings) and recognises as valid certificates only its own certificates.

It is therefore to be noted that in both cases, in order to provide reliable certificates on people's reliability (in driving or in commercial transactions), these certificates are generated by a party involved in the transaction (the insurance company in one case, a web site manager managing the electronic transaction in the other case) and are released only to registered users (the clients in the case of insurance companies).

On the other hand, it is known to have rating services that are independent form the entities involved in the transaction (seller, purchaser and web site manager).

According to its Abstract, US patent application number US2009/0210444 discloses a rating system of this type, which automatically evaluates and determines authenticity of a rating. The computer system disclosed by US2009/0210444 receives rating information, that includes a rating of a company that (according to a declaration of the rater) is involved in a transaction with the rater, and rater profile information, which includes identification information and usage information associated with a user of the computer based service. Based on this information, the computer system determines a risk level and generates an evaluation outcome message that is communicated to the rater. The evaluation outcome message may include an acceptance message, an information request message, and a rejection message. With the acceptance message, the service accepts the rating for storage in a rating information database. With the information request message, the service implements a verification process. With the rejection message, the service rejects the rating.

Notwithstanding all the control measure and the evaluation steps taken by the computer system, the method for collecting feedback information on ratable object disclosed by US2009/0210444 cannot certificate that the feedback has been given by somebody that was really involved in a transaction with the rater.

It is therefore felt the need for a service that is independent from a party involved in the transaction (e.g. the seller or a web site like eBay®) and that allow to certify reliability of entities (people or objects) involved in transactions. In particular, it is felt the need for a system for distributing feedback (in particular relating to companies and people like sellers and purchasers) on several websites different from those collecting the feedback.

SUMMARY OF THE INVENTION

In one aspect, the present invention is directed to a method, a system and a computer unit for certifying feedback or rating information relating to transactions, and in particular relating to entities involved in transactions, which overcomes one, some or all of the drawbacks of prior-art devices and/or systems and/or techniques.

The present invention, in one or more embodiments, may provide a computerized Certification Entity which receives information of a transaction between a seller and a purchaser, and takes contact with the purchaser and with the seller for obtaining feedback or rating information about an entity involved in the transaction; for sake of clarity, it is to be understood that with the term "entity involved in a transaction" it is intended to comprise both a person involved in the transaction (the seller and/or the purchaser) and the object (product or service) involved in the transaction.

In one embodiment, the Certification Entity is a computer server or a network of computer servers that receives (through e-mail, SMS or any other form) information relating to an e-mail address or any other form of identification of the purchaser and of the seller, and is therefore able to take contact with the purchaser and the seller for obtaining feedback information on an entity involved in the transaction, e.g. the seller can give feedback on the purchaser and vice versa.

In one preferred embodiment, a transaction receipt containing both the e-mail address of the sender and of the addressee is transmitted to the Certification Entity, so that it can certify that a transaction really took place between seller and purchaser. By contacting purchaser and seller, the Certification Entity collects reliable feedback information that comes from people that were really involved in the transaction for which feedback are given thereby removing the risk of false feedback.

Notably, the Certification Entity can contact the purchaser by sending an e-mail containing a link to a dedicated webpage which has been preliminary prepared by the Certification Entity, and which can be reached only by the purchaser by clicking on the link contained in the e-mail. In this way, the risk that a fraudulent user sends feedback to the Certification Entity using a spoofed e-mail address can be reduced. The Certification Entity can also send a similar link to the seller in order to release feedback regarding the purchaser's conduct.

Nevertheless, since the seller can be involved in a great number of transactions and could not rate or give feedback on all of them, the Certification Entity collects feedback on purchasers by sending to the seller an e-mail containing a link to a purchaser dedicated webpage. The Certification Entity collects information on transactions between a given purchaser and seller and, at any given time sends an e-mail to the seller asking for feedback on the average conduct of the given purchaser by accessing the purchaser dedicated webpage.

In a further embodiment, the Certification Entity is connected to a plurality of websites which inform it of the products, objects or company names that are available on the website and that can be rated. In this embodiment, the Certification Entity can send to different websites the same feedback, so that a reliable feedback is available on the web and not only on a single website.

Notwithstanding the invention is described and illustrated herein with reference to a limited number of embodiments, it is understood that various combinations of the elements, computers, computer server, circuital and logic blocks, other than those specifically illustrated, are contemplated and are within the scope of the present invention which is defined by the attached claims forming integral part of the present description.

BRIEF DESCRIPTION OF THE DRAWINGS

The invention will be presented herebelow with reference to non limiting examples, provided for explicative and non limitative reasons in the annexed drawings. These drawings illustrate different aspects and embodiments of the present invention and, where appropriate, reference numerals illustrating like structures, components, materials and/or elements in different figures are indicated by similar reference numbers.

FIG. 5 illustrates a first embodiment of a database of the Certification Entity of FIG. 1.

FIG. 7 illustrates a second embodiment of a database of the Certification Entity of FIG. 1.

DETAILED DESCRIPTION OF THE PREFERRED EMBODIMENTS

Figure 1:
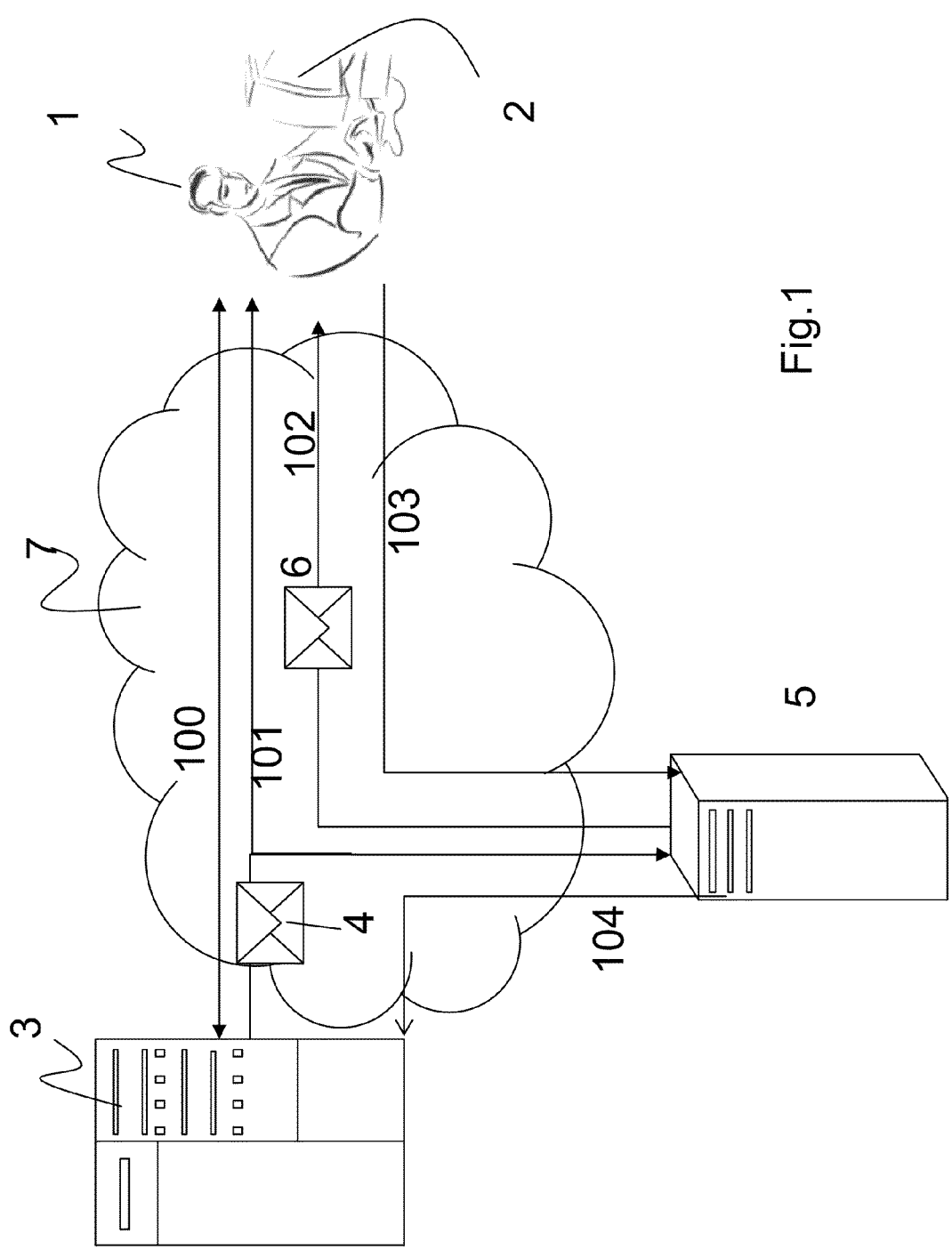
FIG. 1 illustrates a system for certifying feedback authenticity according to a first exemplary embodiment.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted.

In FIG. 1, disclosed is a system for implementing a method for providing certified feedback information on a transaction entity involved in a transaction between a seller and a purchaser. The method is briefly exemplified in FIG. 10.

Figure 10:
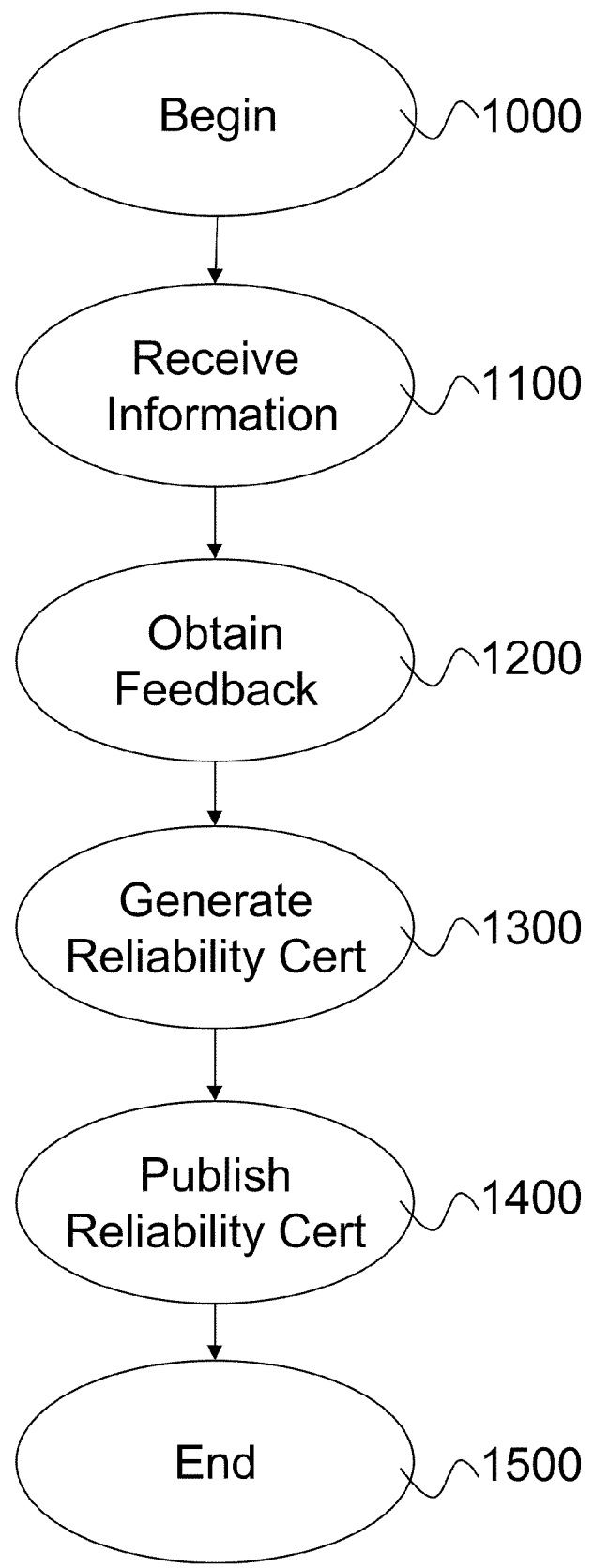
FIG. 10 is a flow diagram of a method according to an embodiment of the invention.

The flow chart of FIG. 10 illustrates a method according a preferred embodiment of the invention. The process begins at step 1000. At step 1100 the seller transmits to a computerized Certification Entity information relating to the transaction and to the purchaser. At step 1200 the computerized Certification Entity, having knowledge of the seller and of the purchaser, collects feedback information relating to an entity involved in the transaction by contacting the seller or the purchaser. At step 1300 the computerized Certification Entity generates a reliability certificate for said entity involved in the transaction, said reliability certificate depending on the collected feedback information. At step 1400 the reliability certificate is made available to a remote computer system of a user for being displayed on a display of the remote computer system together with information on the transaction entity for which the reliability certificate has been issued. At step 1500 the process for providing certified information relative to transactions ends.

Referring back to FIG. 1, in a first embodiment of an aspect of the present invention, a user 1 is provided with a computer system 2 and access the Internet 7 via standard Internet applications such as web browsers like Microsoft® Internet Explorer®, FireFox® or similar. By surfing the Internet, user 1 connects to a website which is an application running on a web server 3 (or HTTP server) of the type known per se (e.g., Apache 2.2).

Figure 3:
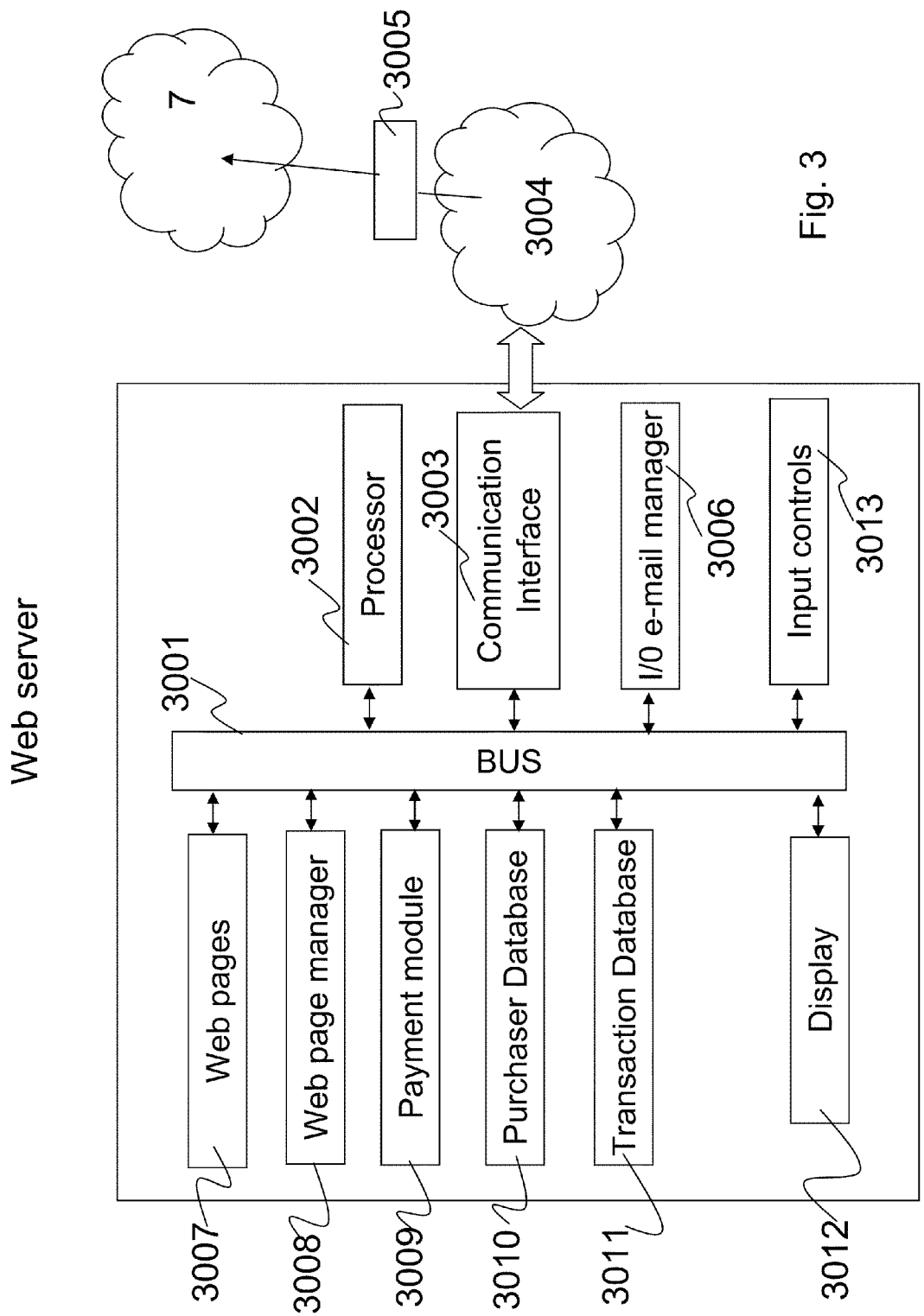
FIG. 3 illustrates a block diagram of the web server of FIG. 1.

Web server 3 (shown in FIG. 3) comprises a communication bus 3001 and a plurality of electronic modules exchanging information over the bus 3001. Processor 3002 processes information exchanged over the bus and controls operation of other modules connected over the bus 3001.

Through the communication interface 3003, the web server 3 receives and transmits information over the Internet 7. In one embodiment, the communication interface 3003 is an Ethernet interface allowing the web server 3 to communicate on a local network 3004 with an Ethernet protocol; the local network (3004) comprises a gateway 3005 for connection to the Internet via a telephone line. Alternatively, interface 3003 can be a gateway or a modem allowing a direct connection to a telephone line or any other communication network. Communication interface also comprises a POP or IMAP protocol for receiving e-mails and an SMTP protocol for transmitting e-mails. In order to manage incoming and outgoing e-mails, web server 3 comprises an I/O e-mail manager 3006.

Web server 3 further comprises memory means 3007 for storing web pages that are transmitted to the computer system 2 of user 1 upon request of the latter. Once user 1 digits the http address of a web page managed by the web server 3, processor 3002 receives the request via communication interface 3003 and activates the web page manager 3008 which retrieves the desired web page from memory means 3007 and transmits it to the user 1 via communication interface 3003.

Web page manager 3008 is a software application (i.e., code stored in a given memory that is executed by processor 3002 in order to reply to the request received from external computers like computer system 2).

In this embodiment, the website accessed by user 1 and managed by the web server 3 is an e-commerce site, such as site wherein products and services are offered for sale, e.g. Pixmania®. Web server 3 comprises a payment module 3009 necessary to manage communication with banks and/or other financial entities that checks credit cards credentials given by user 1 and allow payment by means of a given credit card or from a given bank account indicated by user 1 at the moment of payment.

When user 1 decides to purchase a product available on the above mentioned website, computer system 2 and web server 3 exchange a number of information 100 that are necessary for concluding the transaction with success, as an example, loading of different web pages, filing of an on-line form for purchasing a product, reply from the web server 3 to request credit card information, reply from the user 1 with requested information, and so on. In this embodiment, information 100 comprises the e-mail address of the user, so that it can be contacted via e-mail. Part of these information 100 are stored in the Purchaser database 3010 and in the Transaction Database 3011; in detail, the Purchaser database comprises information relating to the purchaser (e.g., name, surname, address, e-mail address) while the transaction database keeps details of the transactions (e.g., date, object, purchaser).

Once the transaction between purchaser and seller has successfully concluded, the web server 3 (or any other server of the seller connected to the web server 3) transmits a receipt of the transaction to the user 1. Preferably the receipt is transmitted in electronic format attached to an e-mail 4 that is sent to the e-mail address of the user 1. E-mail is therefore generated by processor 3002 activating the I/O e-mail manager 3006 and retrieving the necessary information from the Purchaser database 3010 and from the Transaction Database 3011.

In this embodiment an e-mail address of a Certification Entity 5 is carbon copied (or blank carbon copied) in the e-mail 4, so that the Certification Entity 5 (that in the embodiment of FIG. 1 is a computerized unit) receives the same message that is transmitted to the purchaser 1. Alternatively e-mail to the Certification Entity 5 can be transmitted in a second instant.

Figure 2:
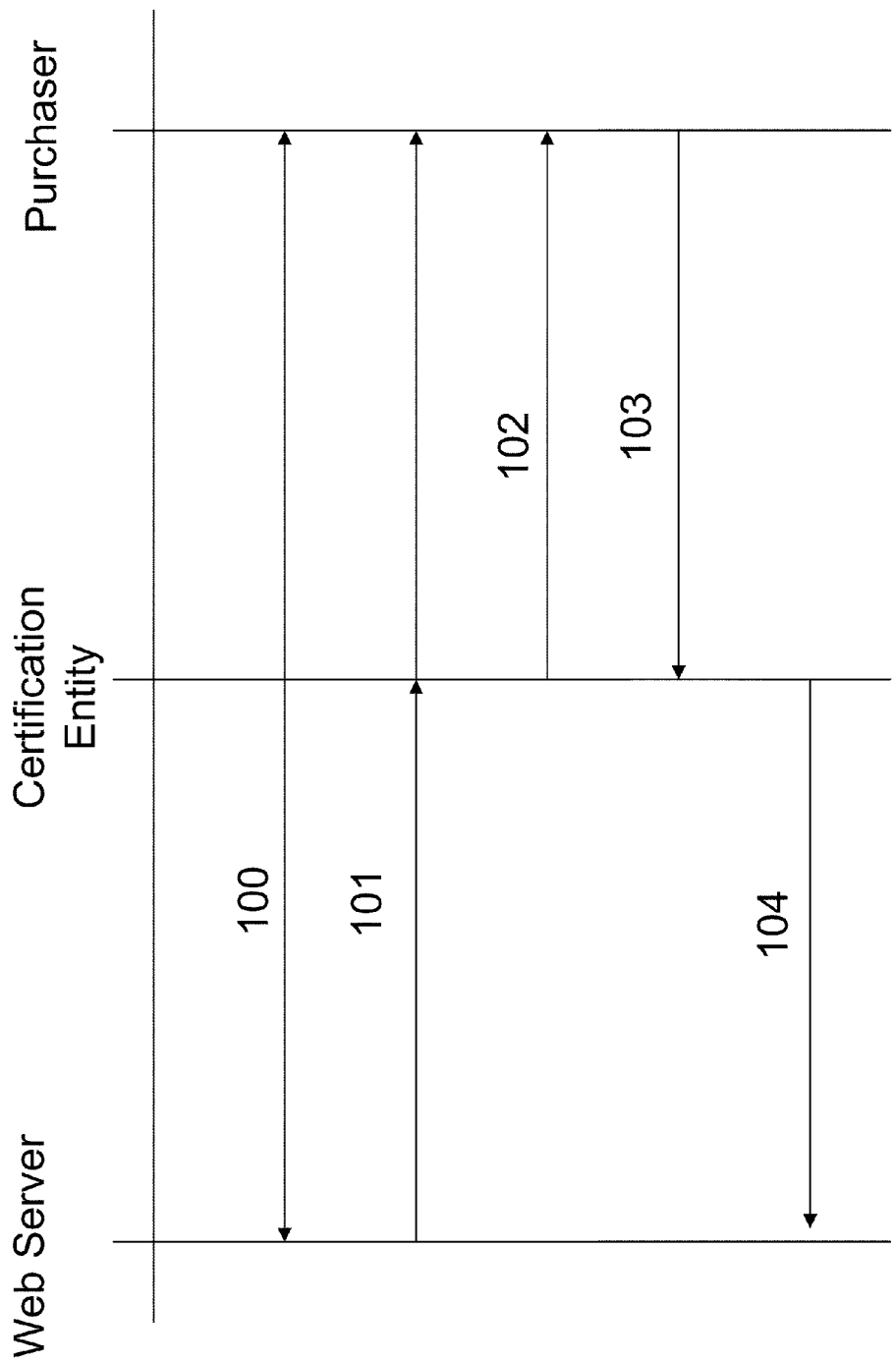
FIG. 2 illustrates a diagram representing the flow of information between elements and users of FIG. 1.

Transmission of e-mail 4 is indicated in FIGS. 1 and 2 with the reference number 101.

Figure 4:
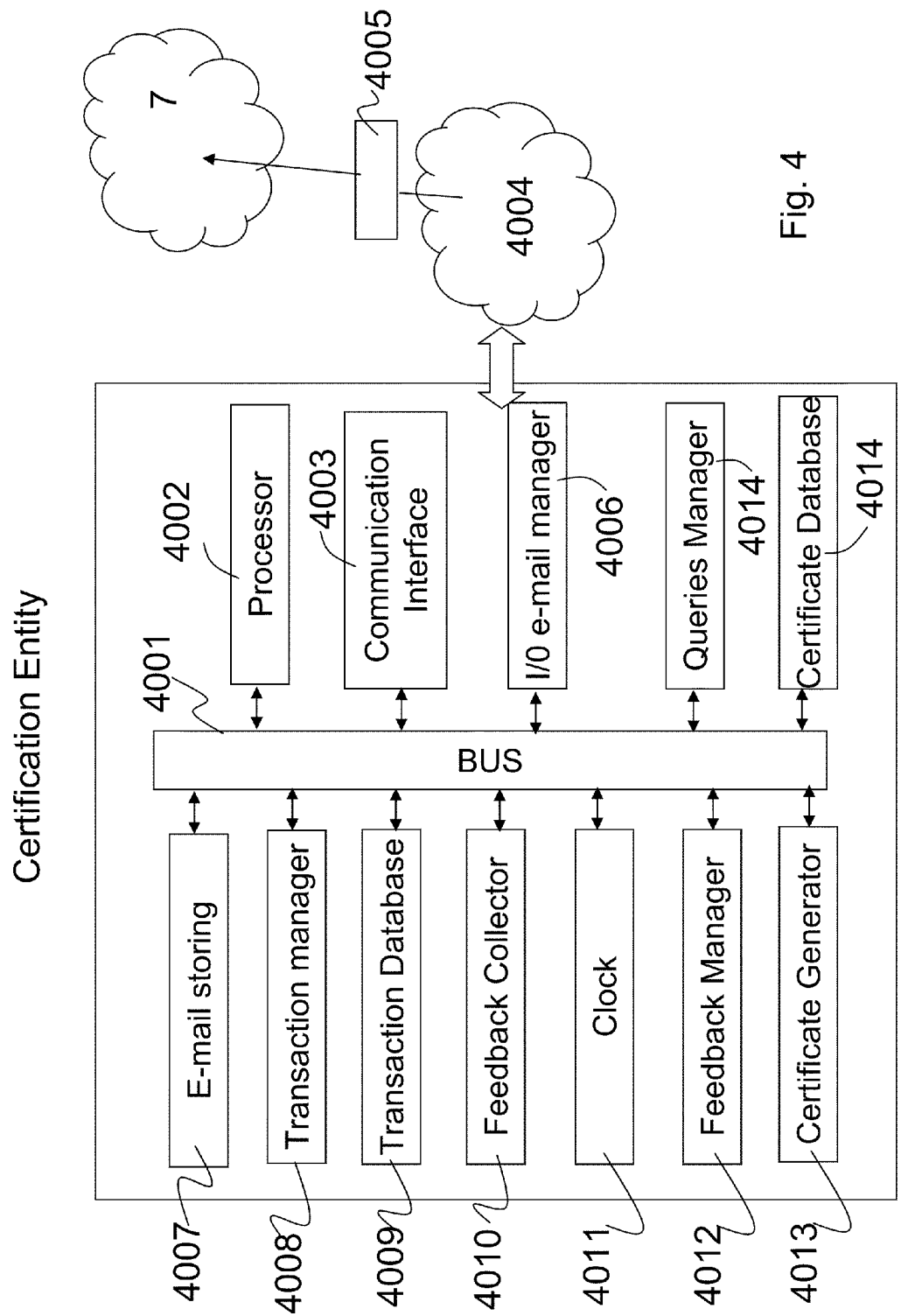
FIG. 4 illustrates a block diagram of a Certification Entity according to an embodiment of the invention.

Certification Entity 5 is shown in FIG. 4 and comprises a processor 4002, a communication interface 4003, and an I/O e-mail manager 4006 communicating over a communication bus 4001. Certification Entity receives through the communication interface 4003 and the I/O e-mail manager 4006, e-mail 4 transmitted by the web server 3. By receiving e-mail 4, I/O e-mail manager 4006 stores e-mail 4 in a memory area 4007.

Periodically, processor 4002 queries the transaction manager 4008 which is a software application that goes though the stored mails in memory 4007 and looks for new mails. Once transaction manager 4008 finds a new e-mail (i.e. an e-mail that has not been previously analyzed), like e-mail 4, it analyzes the header of the message and retrieves the address in the "TO" field, i.e. the e-mail address of the purchaser 1. Transaction manager 4008 flags as read the e-mail 4 stored in memory 4007 and generates a new record in a transaction database 4009, shown in FIG. 5, whose progressive number is stored in field 501 of the database. Following the generation of a new record, transaction manager stores the e-mail address of the purchaser in the field 502 of database 4009.

By analyzing the header of the e-mail 4, transaction manager also retrieves the sender's e-mail address (in the "FROM" field), which is the source of the e-mail 4, and stores it in the field 505 of the database. Alternatively, the Certification Entity is provided with a look-up table associating the name of the seller to the seller's e-mail address. In this way using this look-up table the transaction manager can put into field 505 the name of the seller.

After that, transaction manager 4008 analyzes the body of the e-mail message and retrieves further information relating to the transaction (e.g., a transaction code) that is then stored in field 503 of the database 4009. This operation is, for example, carried out by analyzing the text and looking for a code number having a predetermined format (e.g., a code comprising M numbers followed by N letters (M and N being integers)). Alternatively, instead of retrieving a transaction code in the text of the message, the transaction code that is stored in field 503 of database 4009 could be a hash code generated by the transaction manager, for instance by starting from the text contained in the body of the message; this hash code, that is proper of the transaction and suitable for identifying it, is generated by coding the e-mail with coding means. This solution being simpler and more secure, therefore preferred. The hash code can be generated in a known way by using per se known coding algorithms like those used for generating electronic signatures.

Finally, the transaction manager stores in field 504 of the database 4009 the date (and eventually the time) of the transaction, or the date and time of reception of the e-mail 4.

Certification Entity 5 has thus the knowledge of a purchaser involved in a give transaction and can contact him in order to collect feedback information about the seller and the product/service object that has been bought. In the same way, the Certification Entity 5 can contact the seller for obtaining feedback information on the purchaser as better explained below.

In a preferred embodiment, the Certification Entity contacts the purchaser after a certain period, e.g. 30 days, which is sufficient to be quite certain that the product/service object bought has been delivered/performed. Time knowledge is obtained through a clock module 4011 that keeps time and date and can be interrogated by other modules of the Certification Entity 5 through the communication bus 4001. This predetermined time depends on the object of the transaction, as an example this predetermined time is of 1 or 2 days if the transaction relates to a downloadable object (e.g., a music file). In one embodiment, this predetermined time can be set by the seller.

To this end, the Certification Entity 5 periodically runs a "feedback collection" algorithm, indicated in FIG. 4 as feedback collector 4010. Feedback collector 4010 looks into the transaction database 4009 for the records wherein the date of the transaction is older than a predetermined period of time, and wherein the field 507 ("Request Sent") is not flagged. In other words, feedback collector looks for purchasers that have not been asked for feedback information, and that have successfully concluded a transaction more than a predetermined period of time ago (e.g., 30 days).

The feedback collector then generates an e-mail 6 inviting the purchaser to provide his feedback on a web page available at a particular http address that can be reached via a link contained in the e-mail. Preferably, this web page is kept active by the Certification Entity only for a predetermined period of time, after which the web page is no longer accessible by the purchaser.

E-mail 6 is passed to the I/O e-mail manager 4006 that transmits it (reference number 102) to the e-mail address of the purchaser 1 and field 507 is updated, e.g. by adding a flag that indicates that the purchaser has been contacted.

Figure 6:
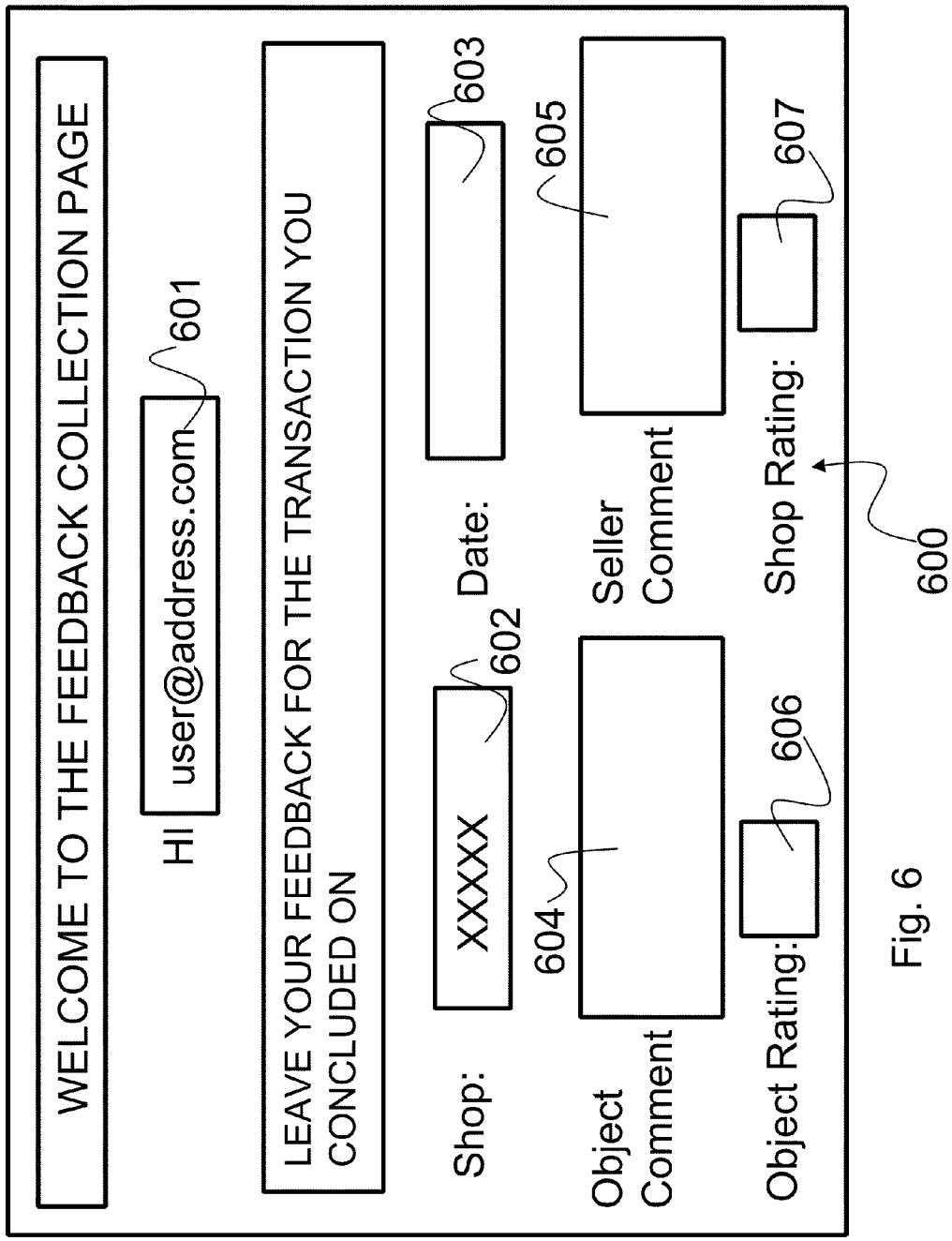
FIG. 6 illustrates a feedback collection web page according to an embodiment of the present invention.

In a preferred embodiment, the http address of the web page for collecting the feedback is dedicated to a particular user and a particular transaction, e.g., it contains the "transaction code" or a "rating code" that is generated as a function of user e-mail address and transaction code. In this way, the web page generated by the feedback collector is not accessed by other users surfing the Internet since they do not know the http address, nor they can reach it via searching tools, the reason being that this web page is not visited and is not a web page linked by other web sites. Purchaser 1 then connects to the web page, e.g. by clicking on the link in the e-mail 6, and leaves his feedback on the web page that is managed by the Certification Entity 5. An example of the web page for collecting feedback that is displayed on the display of computer system 2, is indicated in FIG. 6, discussed in more details in the following, showing the fields that are presented to the user.

Certification Entity 5 therefore collects a reliable feedback from a user who purchased and used a certain product/service object for which feedback is requested. In particular, Certification Entity 5 collects at least some feedback, in the form of a rating, on the seller and on the purchased object; this feedback is then stored in field 506 of database 4009.

To this purpose, Certification Entity 5 comprises a Feedback Manager 4012 that is activated by processor 4002 once the request for a given feedback collection web page is received via communication interface 4003. Feedback Manager 4012 reads the feedback that purchaser 1 leaves on the collection web page and stores it in one or more fields within the transaction database 4009. This flow of information from purchaser to Certification Entity is indicated with reference number 103 in FIGS. 1 and 2.

In the exemplary embodiment of FIGS. 1 and 2, the feedback is then transmitted from the Feedback Manager 4012 to the web server 3 so that it can be published. To this purpose the Feedback Manager 4012 transmits (step 104 in FIG. 2) to the web server 3 the feedback that has been collected together with the transaction code or with a copy of e-mail 4, i.e. of the transaction receipt. In this way, the web server 3 knows to which transaction the feedback is related and can publish on the web site eventual feedbacks that have been given on the product/service object of the transaction.

The Certification Entity 5 comprises a certificate generator 4013 which elaborates statistics on the seller ratings collected from the purchasers and generates a reliability certificate, e.g. in the form of a rating, that is transmitted to the seller. Reliability certificates are stored in a Certificate Database 4014 wherein each person, company, product and service object involved in a transaction tracked by the Certification Entity is associated to its own reliability certificate.

In general, a reliability certificate comprises a reliability value and a number of transactions on which the person or company or product or service was involved. As far as persons or companies is concerned, in one embodiment the reliability value is expressed as a percentage of successful transactions over the total number of transactions in which the person was involved. In a further embodiment, the reliability certificate is calculated as an average of several ratings feedback collected for each transaction, e.g., delivery time, quality of service, conformity of product to the description, availability of the seller to refund and/or exchange a product sold to the purchaser. In a further embodiment, the Certification Entity 5 does not transmit the feedback to the web server 3, but instead sends a communication that feedback is available for the product/service object and/or seller and gives the web server 3 a code, e.g. the record progressive number contained in field 501 of database 4009. This number identifies univocally the feedback left by the purchaser.

The web server 3 therefore could present, on a webpage, a link to the record stored in the Certification Entity so that by clicking on this link the user is redirected to a web page of the Certification Entity wherein he can find the feedback in question. This solution provides the advantage that the owner of the web server 3 cannot modify the feedback, therefore it is very advantageous for the feedback reliability.

In FIG. 6, shown is an example of a web page 600 allowing the filing of feedback. As said above, web page 600 is dedicated to a particular user and a particular transaction, therefore data relative to this transaction are indicated in the web page (e.g., field 601 indicates the purchaser's e-mail address, field 602 indicates the name of the shop, field 603 indicates the date the transaction was successfully concluded). Web page 600 also comprises fields 604 and 605 for leaving text comments respectively on the product/service object bought and on the seller. The purchaser is also given the possibility to leave feedback in the form of a rating (e.g., expressed as a vote from 1 to 5) by means of field 606 and 607. Rating can also be expressed by means of predetermined ratings, such as "positive," "negative" and "fair," that can be presented as selectable options in the web page. In this case, fields 506 and 507 (Object Rate and Shop Rate) will comprise certain values or characters like '+' for positive, '−' for negative or '0' for fair.

All the information left by the purchaser on web page 600 is stored in database 4009 which, to this purpose, comprises also fields 508, 509 and 510 for storing respectively the Object Comment, the Store Rating and the Seller Comment.

In a preferred embodiment, the Certification Entity collects also information suitable to identify the product or service object of the transaction: this information can be collected from the purchaser, e.g., via the web page 600, or more preferably is collected from the web server 3 that gives this information in the transaction receipt/e-mail or that communicates this information to the Certification Entity in other way.

In this embodiment, database 4009 further comprises fields 511 and 512 for storing the object trademark and object model as indicated in FIG. 7.

Figure 8:
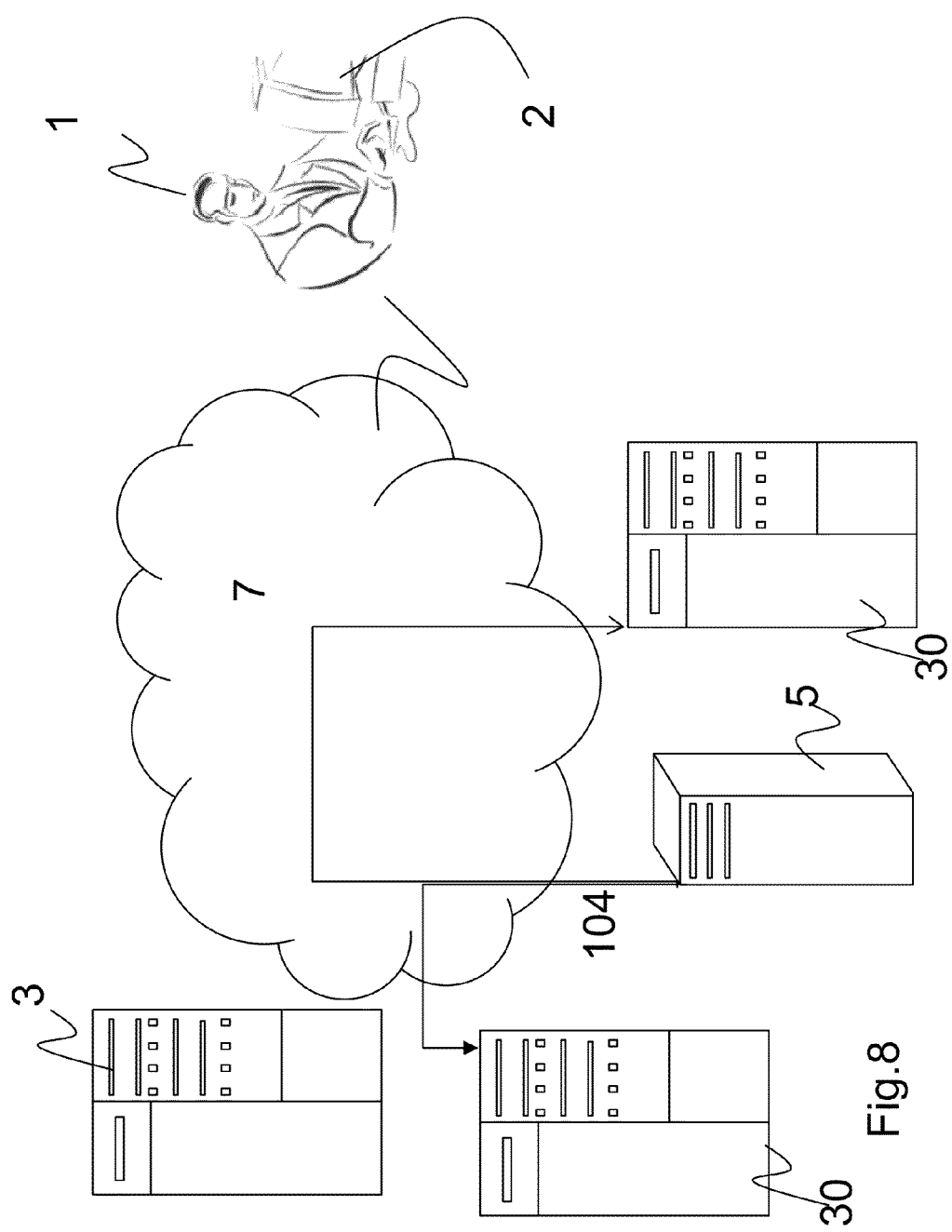
FIG. 8 illustrates a system for certifying feedback authenticity according to a second exemplary embodiment of the invention.

This provides a great advantage, in that the Certification Entity can provide the collected feedback, as well as the reliability certificates generated by the Certificate Generator, to a plurality of web servers 30 pertaining to different entities as indicated in FIG. 8.

Each web server 3 and 30 receives feedback or reliability certificates relating to entities involved in transactions; the information relating to the product or service object of the transaction is associated to the information stored in fields 511 and 512 of database 4009. In this way, also web servers 30 can provide to their users reliable feedback information relating to some ratable objects. In the same way, a web server 30 advertising a given company or reporting the name of a person in relation to certain arguments (e.g. reporting a list of professional representatives) can publish the reliability certificate of the company and/or of the person.

In one embodiment, the Certification Entity 5 is able to collect and certify feedback information for traditional shops (shops not selling or advertising on-line). In this way, reliability certificates can also be provided to bricks and mortar businesses. In this embodiment, the traditional shop (seller) gives the purchaser a paper receipt and collects information relating to the transaction and the purchaser (e.g., the e-mail address of the purchaser). Collection of this information can be done manually by asking for such information from each purchaser, or can be made automatically through use of promotional cards (aka "customer loyalty cards") which can be read at the cash register at the moment of payment; these cards are given to purchasers that use them in order to get discounts or prizes. Information collected by the seller is preferably transmitted electronically to the Certification Entity (e.g., by means of an e-mail, by means of a TELNET connection). The Certification Entity in turns stores in database 4009 the information received by the seller.

Alternatively, the purchaser's credit cards could be linked to such a system whereby the Issuer (e.g., VISA®, AMEX®) could inform the Certification Entity that a transaction took place. In such an embodiment, either the Issuer or the Certification Entity could follow up with the parties to solicit feedback; the Issuer acting as a separate computer of the Certification Entity, which therefore result in a distributed computer network with different computers interconnected and implementing different features.

As for the embodiment of FIGS. 1-5 described above, the Certification Entity 5 sends an e-mail 6 to the purchaser inviting him to give feedback on a dedicated web page. The information obtained by the Certification Entity from the purchaser is then transmitted both to the traditional shops and to the on-line shops. Transmission is preferably in electronic form, e.g. by e-mail or internet connection.

The shop is therefore provided with a wire or wireless connection to the Certification Entity for receiving this information at its premises. Connection can be via any communication network, like a telephone network, a computer network, or a broadcast network (e.g., a radio broadcast). Traditional shops therefore can publish the comments and/or feedback and/or reliability certificate on their shop-windows or preferably on a monitor connected to the Certification Entity. This latter solution is preferred because allows real-time updating of the shop's rating (reliability certificate) and of the products sold in the shops (or services offered); a better service is therefore provided by the traditional shops, which, nowadays do not provide updated feedback from the purchasers.

In order to allow real time information on the shop rating, in one embodiment the shop is provided with an identification code, in particular a bar code and more particularly a bidimensional bar code, that is at the shop premises. Users are provided with an enhanced communication device (a "client computer," e.g., telephone, smart phone, PDA, laptop, desktop computer, mobile device) provided with an image capture device (e.g., camera, scanner, RFID tag reader) for acquiring at least an image of the bar code (or other identification/data), and tools for transmitting (e.g., radio link) the acquired image or data encoded in said image to the Certification Entity. The Certification Entity receives the bar code image/data, decodes it and transmits back to the enhanced communication device of the user the reliability certificate of the shop; the latter is then displayed on the communication device of the user. RFID tags and other identification means could likewise be utilized.

In one embodiment, users surfing the Internet are provided with a software plug-in that can be downloaded. The plug-in is a software application that analyses the content of the web page (e.g. by reading the HTML code embedded) and manages toolbars and overlays providing rating information on objects visible on the web page. Rating information is preferably retrieved connecting to the Certification Entity 5. This is very useful in particular for ordering results provided by search engines.

Suppose a user looks for a digital camera, and uses a search engine like Google®; the search engines returns a list of results in the form of links to web pages. The plug-in provided to the user analyses the HTML code of the results returned by the search engine and queries the Certification Entity 5 for rating information relating to names of companies, products, people or images contained in the HTML code of the web page returned by the search engine.

In a simpler embodiment, the plug-in senses the presence of active links in the web page and returns these links to the Certification Entity 5 which is therefore in charge of extracting names of people, companies, products or services from the link.

The query of the user is received via communication interface 4003 and managed by the Queries Manager 4015. The Queries Manager 4015 decodes the queries received (e.g., analyzes the links received by the user and extracts names) and retrieves from the certificate database 4014 the certificates for the people and/or companies and/or products and/or services requested by the user or in any other way retrieved after analyzing the query of the user. Information retrieved from the Queries Manager is transmitted via communication interface 4003 to the computer of the querying user. Upon reception of the reliability certificates, the plug-in generates one or more overlays which display the certificates next to the links in the webpage of the search engine results.

Preferably, in one embodiment, the plug-in ordinates the results of the search engine depending on the rating, so that the user knows where to find the product/service (e.g., digital camera) available with a reliable feedback. The web page of the search result is therefore transformed in a new web page.

Alternatively, the Certification Entity works as a proxy server, so that when user 1 connects to the Internet 7, all the information between the computer system 2 and the remote web servers (e.g., web server 3) passes through the Certification Entity 5. In this embodiment, when the user requests a web page (e.g., he makes a search with a search tool like Google® and obtains a result page) the latter is processed by the Certification Entity, which receives it, analyzes it and retrieves names of people, companies, products or services for which a reliability certificate is available. This can be accomplished by providing the Certification Entity a module implementing features of the plug-in and of the Queries Manager above described.

The Certification Entity will then generate a new web page comprising the web page received from external web sites (e.g. the result page of Google®) and the reliability certificates overlaid on the same web page. The web page requested by the user is therefore transformed in a new web page that is transmitted back to the user 1 for displaying on the user's computer system 2.

It is now clear that the person skilled in the art can provide many changes to the embodiment above described without departing from the scope of the present invention as it results from the annexed claims.

Figure 9:
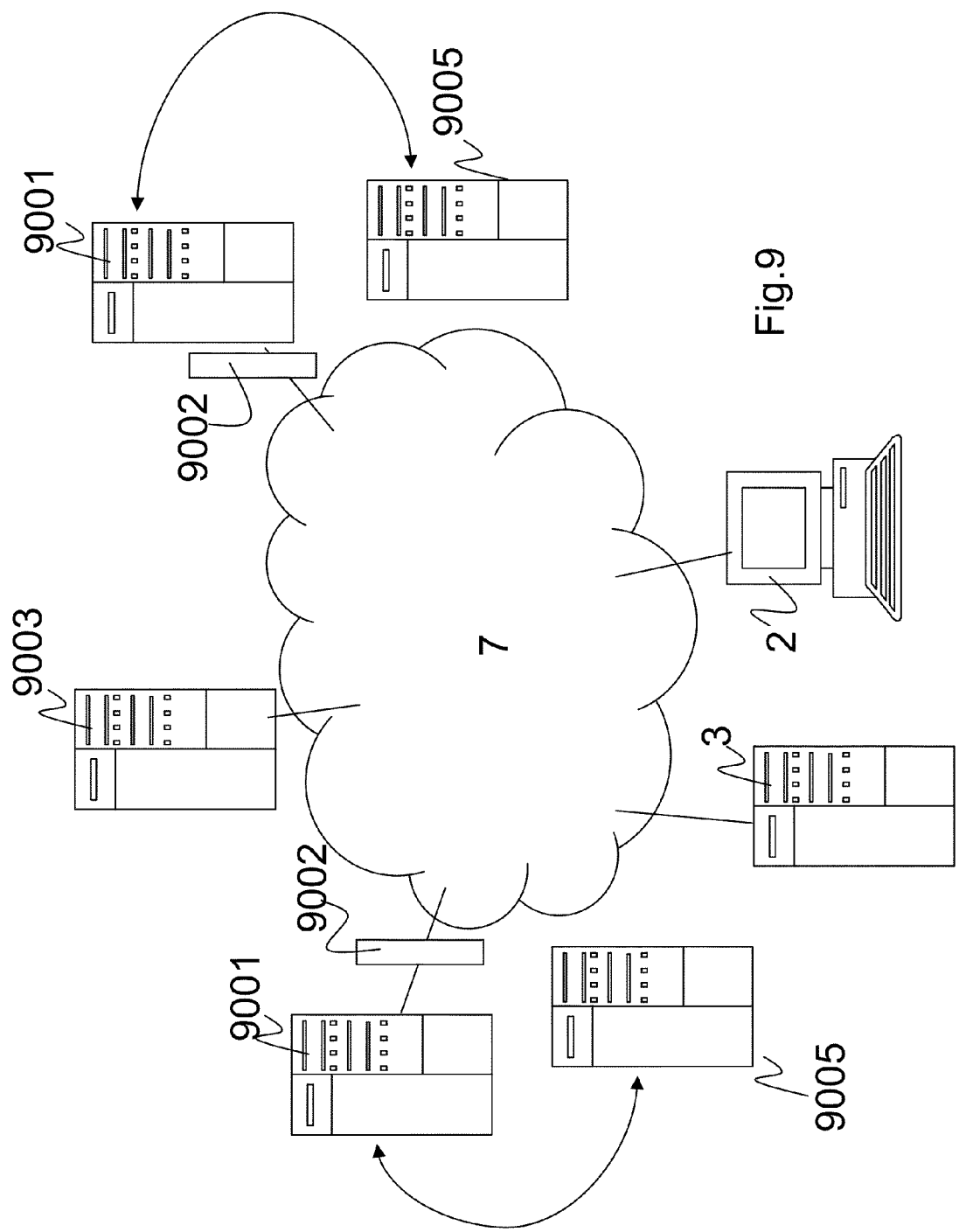
FIG. 9 illustrates Certification Entity according to a second embodiment of the invention.

In particular, the web servers and the Certification Entity can be made as a group of elements in various ways connected and/or distributed. As an example, the Certification Entity 5 can be a network of computer as shown in FIG. 9. In this embodiment, the Certification Entity comprises a plurality of remote servers 9001 which are distributed all around the world in order to reduce the distances with purchasers and sellers. These remote servers 9001 are the front end of the Certification Entity and therefore store copies of the reliability certificates (ratings) into any of the database servers 9005 and reply to queries from the plug-in distributed to the users via the Internet 7; a firewall 9002 is therefore provided to improve security of the Certification Entity.

Certification Entity further comprises a mail server 9003 which receives e-mail from the sellers and stores them. A copy of the received e-mails or the information required for the transaction database 4009 are stored in any of the database servers 9005 wherein reliability certificates are generated or modified depending on the feedbacks received from the users (sellers or purchasers) and collected by the remote servers 9001.

In order to improve security, a copy of the transaction database 4009 is stored in several database servers 9005, so that the remote servers 9001 interrogate this servers in order to reply to the queries from external users having a plug-in installed in their computers.

The same remote servers 9001 collect the feedback from the raters (represented in FIG. 9 by computer system 2) through a dedicated web interface.

Database servers 9005 are connected and synchronized in order to keep all the DB servers 9005 updated.

The feedback collected by the Certification Entity (whether a single unit or a network of computer) can be in various way made available, and used. In particular, in one embodiment, the Certification Entity generates statistics on the users, therefore providing to other users or shoppers, feedback on the user reliability. In particular, the Certification Entity can work as a certification authority that stores all the data of certain registered users and can be interrogated by sellers or companies for requesting certification information on the registered users. The certification authority can grant that a user is a reliable purchaser that uses to make transactions for a certain amount of money. In case of problems in the transaction, the Certification Entity has all the data of the registered user and therefore civil and criminal actions can be taken against the registered user.

To this purpose, the Certification Entity stores discrete data like the maximum and minimum amount involved in the transactions registered for a given user.

In one embodiment, after a certain amount of time from the date of the transaction, e.g. 10 days, the Certification Entity contacts the seller of the transaction asking information about the purchaser conduct in the transaction, e.g. abuse of the right of recess, payment made with cloned credit cards. In this way the seller can give feedback information on the purchaser, and this information can be made available by the Certification Entity or used by the Certification Entity. This type of user certification is very advantageous since can be used by the purchaser in order to get credit from banks or other entities.

Differently from other types of certifications, which are based on statistics generated from sources of information not necessarily reliable, in this case, the statistics on the user reliability are collected from the Certification Entity by contacting a party involved in a transaction with the user, and therefore a party that really knows and can give reliable feedback on the user.

In order to provide this information, in one embodiment the Feedback Collector 4010 of the Certification Entity sends an e-mail to the web server 3 substantially in the same way as e-mail 6 is generated and sent to the purchaser. The web server 3 receives the e-mail from the Certification Entity via the communication interface 3003 and an operator will be able to fill the feedback form by displaying on display 3012 the e-mail and the feedback collection web page that is accessible by clicking a link in the e-mail. Web server 3 is provided with input controls 3013 so that the user can browse the feedback collection web page and leave the feedback.

Clearly, since the e-mails can be read from any computer different from the web server 3, feedback from the seller on the purchaser can be left using any other computer provided with a web browser and a mail client.

In a further embodiment, Certification Entity 5 can manage disputes between purchaser and seller. If a purchaser gives a negative feedback on the seller, then the Certification Entity can freeze registration of the negative feedback and send an e-mail to both the purchaser and the seller giving them a predetermined amount of time for solving any possible dispute between the two. After this time, the Certification Entity sends a new e-mail to the purchaser asking for a final feedback for the same transaction. This feedback is collected via a dedicated webpage and is then registered in database 4009.

In a further embodiment, the software plug-in can be adapted to analyze the content of text pages (i.e. a page containing at least some text) provided by other software different from a web browser. As an example, the plug in can be adapted to analyze the content of the text portion of an e-mail displayed by a mail client, like Microsoft Outlook®, or can be adapted to analyze the content of a map displayed by a navigator tool and provided with names of restaurants, hotels, and other point of interest. Having analyzed the text page, the plug-in than queries the certification entity for reliability certificates to be displayed next to the relative information (e.g. the name of a person or a trademark) in the text page. Retrieval of the reliability certificates to be displayed is made as explained above with reference to the plug-in analyzing the web page.

In another embodiment, disclosed is a method for providing certified feedback information on a transaction entity involved in a transaction between a seller and a purchaser, the method comprising a Certification Entity: receiving information from said seller relating to said transaction and said purchaser; collecting feedback regarding said transaction entity from at least one of said seller and said purchaser; generating a reliability certificate for said transaction entity based upon said collected feedback; and publishing said reliability certificate on a remote computer system for display to a third party user along with information on the transaction entity for which the reliability certificate has been generated. Wherein the transaction entity is selected from the group consisting of the seller involved in the transaction, the purchaser involved in the transaction, an object involved in the transaction, a product involved in the transaction, and a service involved in the transaction. Wherein said feedback is collected through a web page dedicated to said purchaser and said transaction. Wherein said feedback is collected by sending a first e-mail to an e-mail address of said purchaser, said e-mail containing a link to said dedicated web page, and wherein a transaction code is generated identifying the transaction, wherein input of said transaction code is required to view said dedicated web page, wherein said information is sent by the seller to said Certification Entity via a second e-mail, and wherein said transaction code is a hash code generated by coding said second e-mail with a coding means, wherein said first e-mail sent to said purchaser is sent after a predetermined amount of time. Wherein said reliability certificates are published on a plurality of web servers. Wherein said third party user utilizes a user computer system, wherein said user computer system is provided with a plug-in that analyzes the content of a third party web page and requests reliability certificates from the computerized Certification Entity for transaction entities referred to on said third party web page, wherein the computerized Certification Entity analyses the request from the plug-in and returns reliability certificates available for some or all of said transaction entities requested by said plug-in, and wherein said plug-in receives said reliability certificates and displays them on the display of the user computer system. Wherein said third party user utilizes a user computer system, wherein said user computer system is provided with a plug-in that analyzes the content of a third party web page, looks for links to other web pages contained in the analysed third party web page, and transmits these links to the computerized Certification Entity, wherein the computerized Certification Entity receives the links, looks for the names of people, objects or services contained both in the links and in a database containing reliability certificates for people, objects or services, and returns reliability certificates available for some or all the people or objects requested by the plug-in, and wherein said plug-in receives the reliability certificates and displays them on the display of the user computer system. Wherein said third party user utilizes a user computer system, wherein the computerized Certification Entity comprises a proxy server, wherein when said user computer system connects to the Internet, information between said user computer system and at least one remote web server passes through the Certification Entity, and wherein when the third party user requests a web page, the latter is transformed by the Certification Entity, which receives it, analyzes it, retrieves names of people, companies, products or services for which a reliability certificate is available, and generates a new web page comprising the third party web page received from said remote web server and the reliability certificates overlaid on the same third party web page.

The purpose of the Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other features and advantages of the claimed invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A computer-implemented method for providing certified feedback information on a transaction between a seller and a purchaser, the method comprising the steps of:
   a computerized communication interface and a I/O e-mail manager receiving information from said seller relating to said transaction and said purchaser, wherein said information is sent by the seller to said computerized communication interface and I/O e-mail manager via a first e-mail, said e-mail comprising a header;
   a processor analyzing said first e-mail sent by the seller to retrieve an e-mail address in said header;
   a processor generating a transaction code identifying the transaction, wherein said transaction code is based on said first e-mail;
   a computerized memory storing said transaction code in a database;
   a computerized communication interface and a I/O e-mail manager sending a second e-mail to an e-mail address of said purchaser or of said seller, said second e-mail containing a link to a dedicated web page;
   a processor implementing an algorithm for collecting feedback through said dedicated web page regarding said transaction from at least one of said seller and said purchaser, wherein input of said transaction code is required to view said dedicated web page and wherein said dedicated web page relates to said purchaser and said transaction or to said seller and said transaction;
   a processor generating a reliability certificate for said transaction based upon said collected feedback; and
   a processor publishing said reliability certificate on a remote computer system for display to a third party user along with information on the transaction for which the reliability certificate has been generated.

2. The computer-implemented method of claim 1, wherein said certified feedback information on said transaction relates to one item selected from the group consisting of the seller involved in the transaction, the purchaser involved in the transaction, an object involved in the transaction, a product involved in the transaction, and a service involved in the transaction.

3. The computer-implemented method of claim 1, wherein said certified feedback information on said transaction relates to one item selected from the group consisting of the seller involved in the transaction, the purchaser involved in the transaction, an object involved in the transaction, a product involved in the transaction, and a service involved in the transaction; and wherein said first e-mail is carbon copied or blank carbon copied to an e-mail address associated to said computerized communication interface and a I/O e-mail manager.

4. The computer-implemented method of claim 1, wherein said first e-mail is carbon copied or blank carbon copied to an e-mail address associated to said computerized communication interface and a I/O e-mail manager; and wherein said transaction code is a hash code generated by a processor coding at least a part of said first e-mail.

5. The computer-implemented method of claim 1, wherein said first e-mail is carbon copied or blank carbon copied to an e-mail address associated to said computerized communication interface and a I/O e-mail manager.

6. The computer-implemented method of claim 1, wherein said transaction code is a hash code generated by a processor coding at least a part of said first e-mail.

7. The computer-implemented method of claim 6, wherein said second e-mail sent to said purchaser or to said seller is sent after a predetermined amount of time.

8. The computer-implemented method of claim 1, wherein said reliability certificate is published on a plurality of web servers.

9. The computer-implemented method of claim 1, wherein said third party user utilizes a user computer system, wherein said user computer system is provided with a software plug-in and a processor that analyze the content of web pages accessed by the third party user, and requests reliability certificates from a database for transactions referred to on said web pages, wherein a second processor processes the request and returns reliability certificates available for some or all of said transactions requested, and wherein said user computer system receives said returned reliability certificates and displays them on a display of the user computer system.

10. The computer-implemented method of claim 1, wherein said third party user utilizes a user computer system, wherein said user computer system is provided with a plug-in that analyzes the content of a third party web page, looks for links to other web pages contained in the analysed third party web page, and transmits these links to the computerized Certification Entity, wherein the computerized Certification Entity receives the links, looks for the names of people, objects or services contained both in the links and in a database containing reliability certificates for people, objects or services, and returns reliability certificates available for some or all the people or objects requested by the plug-in, and wherein said plug-in receives the reliability certificates and displays them on the display of the user computer system.

11. The computer-implemented method of claim 1, wherein said third party user utilizes a user computer system, wherein said user computer system is provided with a plug-in that analyzes the content of a page containing text, looks for links to web pages contained in the analysed text page, and transmits these links to the computerized Certification Entity, wherein the computerized Certification Entity receives the links, looks for the names of people, objects or services contained both in the links and in a database containing reliability certificates for people, objects or services, and returns reliability certificates available for some or all the people or objects requested by the plug-in, and wherein said plug-in receives the reliability certificates and displays them on the display of the user computer system.

12. The computer-implemented method of claim 1, wherein said third party user utilizes a user computer system, wherein said user computer system is provided with a plug-in that analyzes the content of a page containing text, looks for names of people objects or services contained in the analysed text page, and transmits these names to the computerized Certification Entity, wherein the computerized Certification Entity receives the names, and returns reliability certificates available for some or all the people or objects requested by the plug-in, and wherein said plug-in receives the reliability certificates and displays them on the display of the user computer system.

13. The computer-implemented method of claim 1, wherein said third party user utilizes a user computer system, wherein the computerized Certification Entity comprises a proxy server, wherein when said user computer system connects to the Internet, information between said user computer system and at least one remote web server passes through the computerized Certification Entity, and wherein when the third party user requests a web page, the latter is transformed by the computerized Certification Entity, which receives it, analyzes it, retrieves names of people, companies, products or services for which a reliability certificate is available, and generates a new web page comprising the third party web page received from said remote web server and the reliability certificates overlaid on the same third party web page.

14. The computer-implemented method according to claim 1, wherein said computerized Certification Entity is a distributed computer network comprising means for collecting information relating to credit cards or promotional cards used by said purchaser in said transaction, and wherein said computerized Certification Entity retrieves information on said purchaser, in particular the purchaser's e-mail address, by comparing the collected information relating to credit cards or promotional cards with stored data.

15. A computer-implemented method for providing certified feedback information on a transaction between a seller and a purchaser,
wherein the seller transmits to a computerized communication interface and a I/O e-mail manager information relating to the transaction and relating to the purchaser, wherein said information is sent by the seller to said computerized communication interface and I/O e-mail manager via a first e-mail, said first e-mail comprising a header;
a processor analyzes said first e-mail sent by the seller to retrieve an e-mail address in the header thereof;
a processor generates a transaction code identifying the transaction, wherein said transaction code is based on said first e-mail;
a computerized memory stores said transaction code in a database;
a computerized communication interface and a I/O e-mail manager send a second e-mail to an e-mail address of said purchaser or of said seller, said second e-mail containing a link to a dedicated web page;
wherein a processor implements an algorithm for collecting feedback information through a dedicated web page relating to the transaction, by contacting the seller or the purchaser, wherein input of said transaction code is required to view said dedicated web page and wherein said web page relates to said purchaser and said transaction or to said seller and said transaction;
wherein a processor generates a reliability certificate for said transaction, said reliability certificate depending on the collected feedback information, and
wherein a processor makes available the reliability certificate to a remote user computer system for being displayed on a display of the remote user computer system together with information on the transaction for which the reliability certificate has been issued.

16. The computer-implemented method of claim 15, wherein the certified feedback information relates to the seller, or to the purchaser and or to an object, product or service involved in the transaction.

17. The computer-implemented method of claim 16, wherein the transaction code is an hash code generated by a processor coding at least a part of the first e-mail; and wherein the reliability certificate is transmitted to a plurality of web servers together with an identifier of the transaction for which the certificate is generated.

18. The computer-implemented method of claim 16, wherein wherein the transaction code is an hash code generated by a processor coding at least a part of the first e-mail; wherein the reliability certificates are transmitted to a plurality of web servers together with an identifier of the transaction for which the certificate is generated; and wherein the second e-mail sent to the purchaser is sent after a predetermined amount of time.

19. The computer-implemented method of claim 16, wherein wherein the transaction code is an hash code generated by a processor coding at least a part of the first e-mail; and wherein the user computer system is provided with a software plug-in and a processor that analyze the content of web pages and request reliability certificates for transactions referred to on the web pages, wherein a second processor analyses the request and returns reliability certificates available for some or all of the transactions requested, and wherein the user computer system receives the reliability certificates and displays them on a display of the user computer system.

20. The computer-implemented method of claim 16, wherein the reliability certificate is transmitted to a plurality of web servers together with an identifier of the transaction for which the certificate is generated.

21. The computer-implemented method of claim 16, wherein the user computer system is provided with a software plug-in and a processor that analyze the content of web pages and request reliability certificates for transactions referred to on the web pages, wherein a second processor analyses the request and returns reliability certificates available for some or all of the transactions requested, and wherein the user computer system receives the returned reliability certificates and displays them on a display of the user computer system.

22. The computer-implemented method of claim 16, wherein the user computer system is provided with a plug-in that analyzes the content of a web page, looks for links to other web pages contained in the analysed web page, and transmits these links to the computerized Certification Entity, wherein the computerized Certification Entity receives the links, looks for name of transaction entities contained both in the links and in a database containing reliability certificates for transaction entities, and returns reliability certificates available for some or all of the transaction entities requested by the plug-in, and wherein the plug-in receives the returned reliability certificates and displays them on the display of the user computer system.

23. The computer-implemented method of claim 16, wherein said third party user utilizes a user computer system, wherein said user computer system is provided with a plug-in that analyzes the content of a page containing text, looks for links to web pages contained in the analysed text page, and transmits these links to the computerized Certification Entity, wherein the computerized Certification Entity receives the links, looks for the names of transaction entities contained both in the links and in a database containing reliability certificates for transaction entities, and returns reliability certificates available for some or all of the transaction entities requested by the plug-in, and wherein said plug-in receives the returned reliability certificates and displays them on the display of the user computer system.

24. The computer-implemented method of claim 16, wherein said third party user utilizes a user computer system, wherein said user computer system is provided with a plug-in that analyzes the content of a page containing text, looks for names of transaction entities contained in the analysed text page, and transmits these names to the computerized Certification Entity, wherein the computerized Certification Entity receives said names of transaction entities, and returns reliability certificates available for some or all the transaction entities requested by the plug-in, and wherein said plug-in receives the returned reliability certificates and displays them on the display of the user computer system.

25. The computer-implemented method of claim 16, wherein the computerized Certification Entity comprises a proxy server, so that when the user computer system connects to the Internet, information between the user computer system and a remote web servers passes through the computerized Certification Entity, and wherein when the user requests a web page the latter is transformed by the computerized Certification Entity, which receives it, analyzes it, retrieves names of transaction entities for which a reliability certificate is available, and generates a new web page comprising the web page received from remote web server and the returned reliability certificates overlaid on the same web page.

26. The computer-implemented method of claim 15, wherein the transaction code is an hash code generated by a processor coding at least a part of the first e-mail.

27. The computer-implemented method of claim 26, wherein the second e-mail sent to the purchaser is sent after a predetermined amount of time.

28. A client-server computer network implemented method for providing third party certified feedback information to a prospective party regarding a transaction, wherein the feedback information relates to is one of a seller party, a purchaser party, and an object, product or service involved in the transaction, said method comprising the steps of:

said third party using a computerized communication interface and a I/O e-mail manager soliciting feedback from at least one of said seller and purchaser parties regarding said transaction, said soliciting being via an e-mail sent to at least one of said seller or purchaser parties, wherein said e-mail contains a link to a form on a private web page on a server computer coupled to said client-server computer network, wherein said feedback is obtained from said at least one of said seller and purchaser parties through said form;

said third party obtaining said feedback from said at least one of said seller and purchaser parties through a software user interface connected to a client computer coupled to said client-server computer network;

said third party storing said feedback in a feedback database connected to a server computer coupled to said client-server computer network;

said third party generating by means of processor reliability certificates for at least one transaction based upon data within said feedback database;

said third party storing said reliability certificates in a certificate database on a server computer coupled to said client-server computer network;

said third party receiving by a computerized communication interface a request from said prospective party for at least one of said reliability certificates; and said third party displaying said at least one of said reliability certificates to said prospective party, by generating a request to a server computer coupled to said client-server computer network to create a web page containing said reliability certificates, and said server computer publishing said reliability certificates on a new web page for viewing by said prospective party through use of a software user interface connected to a second client computer, said second client computer coupled to said client-server computer network.

29. The client-server computer network implemented method of claim 28, wherein said step of soliciting feedback takes place after a predetermined period of time has passed after said transaction.

30. The client-server computer network implemented method of claim 28, wherein said feedback is obtained from said at least one of said seller and purchaser parties through a form; and wherein said step of the third party receiving a request from said prospective party for at least one of said reliability certificates comprises said prospective party user utilizing a user computer system, wherein said user computer system is provided with a plug-in that analyzes the content of a third party web page, said plug-in requesting said reliability certificates for transaction entities referred to on said third party web page, and wherein said plug-in receives said reliability certificates and displays them on the display of the user computer system.

31. The client-server computer network implemented method of claim 28, wherein said step of soliciting feedback takes place after a predetermined period of time has passed after said transaction; and wherein said step of the third party receiving a request from said prospective party for at least one of said reliability certificates comprises said prospective party user utilizing a user computer system, wherein said user computer system is provided with a plug-in that analyzes the content of a third party web page, said plug-in requesting said reliability certificates for transaction entities referred to on said third party web page, and wherein said plug-in receives said reliability certificates and displays them on the display of the user computer system.

32. The client-server computer network implemented method of claim 28, wherein said feedback is obtained from said at least one of said seller and purchaser parties through a form; wherein said step of soliciting feedback takes place after a predetermined period of time has passed after said transaction; and wherein said step of the third party receiving a request from said prospective party for at least one of said reliability certificates comprises said prospective party user utilizing a user computer system, wherein said user computer system is provided with a plug-in that analyzes the content of a third party web page, said plug-in requesting said reliability certificates for transaction entities referred to on said third party web page, and wherein said plug-in receives said reliability certificates and displays them on the display of the user computer system.

33. The client-server computer network implemented method of claim 28, wherein said feedback is obtained from said at least one of said seller and purchaser parties through a form.

34. The client-server computer network implemented method of claim 28, wherein said step of soliciting feedback takes place after a predetermined period of time has passed after said transaction.

35. The client-server computer network implemented method of claim 28, wherein said step of the third party receiving a request from said prospective party for at least one of said reliability certificates comprises said prospective party user utilizing a user computer system, wherein said user computer system is provided with a plug-in and a processor that analyzes the content of a third party web page and requests said reliability certificates for transactions referred to on said third party web page, and wherein said user computer system receives the returned reliability certificates and displays them on the display of the user computer system.

36. The client-server computer network implemented method of claim 28, wherein said step of the third party receiving a request from said prospective party for at least one of said reliability certificates comprises said prospective party user utilizing a user computer system, wherein said user computer system is provided with a plug-in that analyzes the content of a page containing text, said plug-in requesting said reliability certificates for transaction entities referred to on said page containing text, and wherein said plug-in receives said reliability certificates and displays them on the display of the user computer system.

37. The client-server computer network implemented method of claim 28, wherein said step of the third party receiving a request from said prospective party for at least one of said reliability certificates comprises the receiving of output of a plug-in installed on a user computer system used by said third party user, said plug-in output generated by analyzing the content of a third party web page containing links, further comprising the step of parsing the names of transaction entities contained both in the links and in a database containing reliability certificates for transaction entities, further comprising the step of returning at least one reliability certificate to said plug-in, said plug-in receiving the reliability certificates and displaying them on the display of the user computer system.

38. The client-server computer network implemented method of claim 28, further comprising the step of:
   providing a proxy server between a user computer system of a prospective party user and at least one remote web server,
   wherein said step of said third party receiving a request from said prospective party for at least one of said reliability certificates comprises:
   said proxy server receiving a web page request from said prospective party user;
   parsing the names of transaction entities contained in said web page request;
   determining if a reliability certificate is available for one of more of said transaction entities; and
   generating a new web page comprising the web page said third party requested overlaid with said reliability certificates.

* * * * *